July 29, 1969
A. N. TSERGAS
3,458,793
PERMANENT MAGNET MOTOR FOR HAND TOOLS AND SPEED CONTROL SYSTEMS THEREFOR
Filed Sept. 27, 1966
3 Sheets-Sheet 1
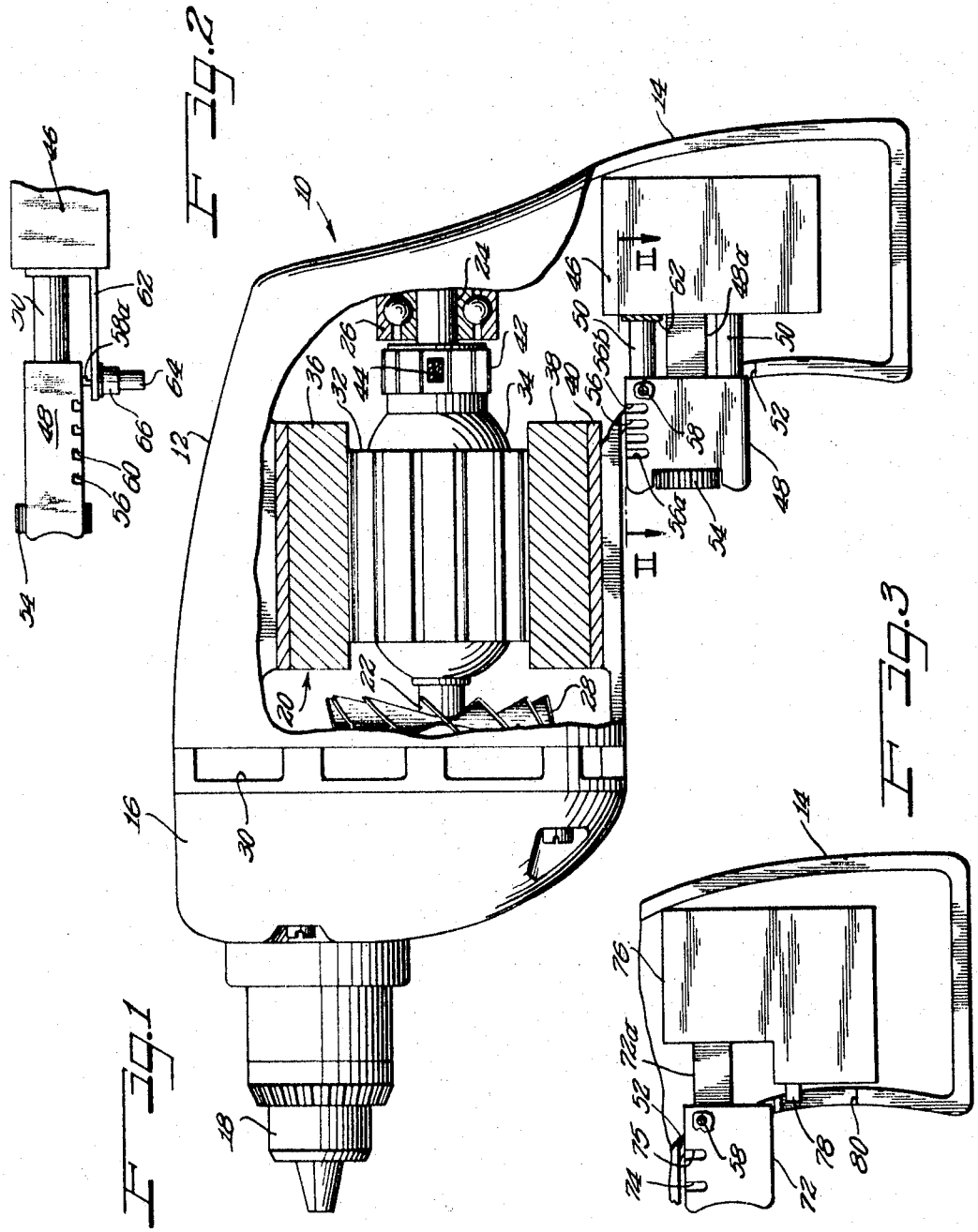
INVENTOR.
Athanase N. Tsergas
BY
ATTORNEYS

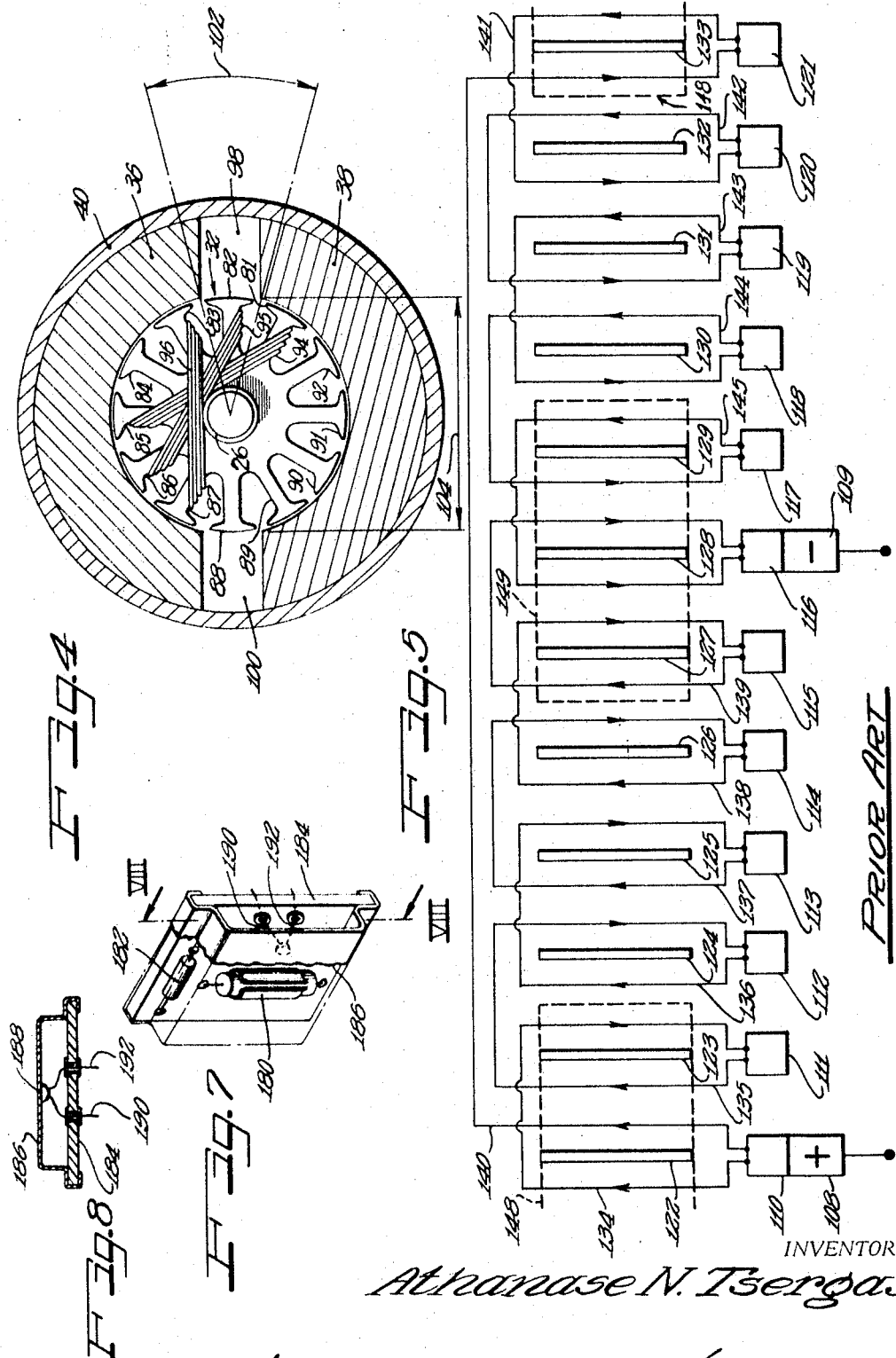

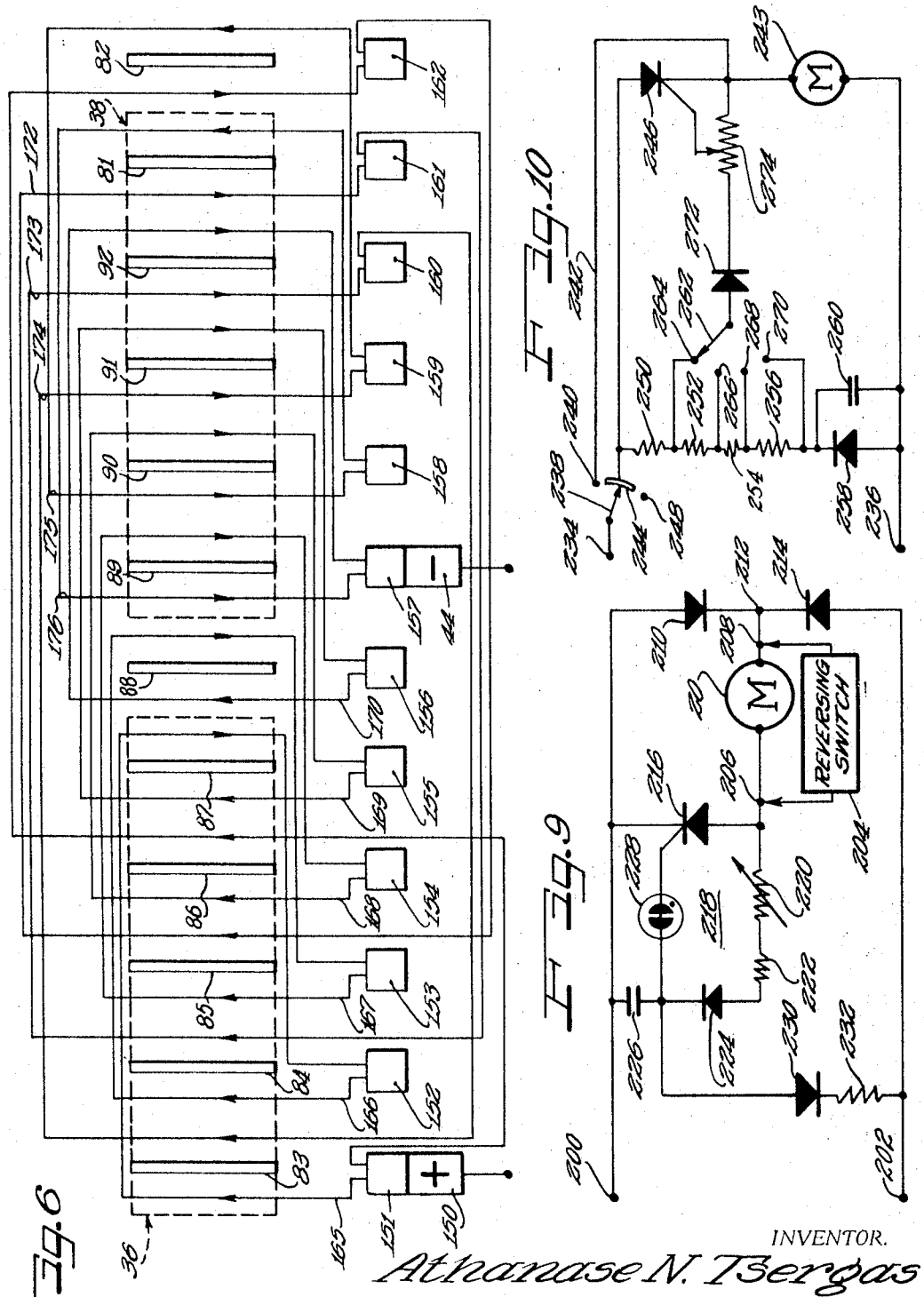

# United States Patent Office 3,458,793
Patented July 29, 1969

3,458,793
PERMANENT MAGNET MOTOR FOR HAND TOOLS AND SPEED CONTROL SYSTEMS THEREFOR
Athanase N. Tsergas, Des Plaines, Ill., assignor to Ram Tool Corporation, Chicago, Ill., a corporation of Illinois
Filed Sept. 27, 1966, Ser. No. 582,309
Int. Cl. H02p 5/06, 5/38, 7/06
U.S. Cl. 318—341          25 Claims

ABSTRACT OF THE DISCLOSURE

A portable hand tool with permanent magnet stator universal-type reversible electric motor having speed control circuitry. The circuitry is the half-wave SCR (or thyristor) rectifier type, and includes a gate circuit capacitor arranged to discharge during alternate half cycles of the AC supply. A diode circuit in parallel with the motor and SCR provides a current path to dissipate a part of the magnetic energy of the motor to avoid braking during the negative half cycle. Speed control is obtained by varying a resistor in the SCR gate circuit with a spring-biased actuator arranged to be held in several fixed positions. In a second embodiment a tapped voltage divider and switch provides coarse speed control and a variable resistor provides fine speed control, all of the elements being connected to the SCR gate circuit. A component circuit board includes a spaced copper strip heat sink with a silicon bead as the SCR wherein the electrodes extend between the bead and the board so as to avoid strain on the bead.

---

This invention relates generally to power tools and the like and more particularly to a power hand tool employing a permanent magnet motor and structures in combination therewith having improved features over existing prior art structures.

The most common type of motor employed in power tools is the series motor having wound field coils. Such field coils are relatively expensive to manufacture and require test equipment to insure that each field coil meets certain requirements of capability and safety. In addition, difficulties are encountered in insulating such field coils from the housing of the tool which is usually metallic.

Speed control circuits for power tools have become more accepted due to the reduced cost of the required components. However, when a speed control circuit is employed with a series motor, more expensive components are required due to the transients produced by the series motor. Furthermore, a particular circuit may depend upon a constant back EMF being produced by the motor to provide desired results. A series motor, however, will not produce a constant back EMF without complicated and expensive limiting devices.

The use of a permanent magnet motor, particularly of alnico material, presents several disadvantages when employed as the power source for a power tool. In such permanent magnet motors, the permanent magnets tend to demagnetize by armature reaction. In order to compensate for such de-magnetization, the permanent magnets must be of relatively thick cross-section. As a result, such permanent magnets are relatively expensive to manufacture. As a general rule, permanent magnets are relatively brittle and therefore relatively difficult to machine.

The ceramic type of permanent magnet is also relatively expensive, especially the dies required for the manufacture thereof. It has not been a customary practice to employ ceramic magnets in power tools, since they do not produce the high magnetic field customarily regarded as necessary for power tools. Such ceramic magnets are also relatively brittle and very susceptible to breakage when dropped.

One of the greatest disadvantages of the permanent magnet motor, of either alnico or ceramic material, is that such permanent magnets lose their magnetization with vibration. A characteristic of power tools, particularly power hand tools, is that vibrations will exist during their use. As a result, the use of a permanent magnet in the form of an alnico or ceramic material has not been considered practical.

It has been customarily considered necessary in the past to employ relatively large magnetic field strengths in power tools in order to achieve the necessary power output while retaining a relatively small size unit. As a result, ceramic magnets have been considered impractical. Although the alnico-type of permanent magnet can provide the required magnetic field strength, it is necessary to space such magnets from one another a distance sufficient to reduce leakage. That is, relatively large air gaps must be provided between opposite magnet sections in order to reduce magnetic leakage. As a result only 50% to 80% of the rotor is utilized for producing rotational forces. If the magnet sections are increased in size, such that the ends of the magnets are relatively closely spaced, the magnetic field strength is reduced by the resultant leakage and as a result, material is wasted.

Speed control circuits have become popular with power hand tools for providing a relatively wide range of motor speeds. In order to reduce the cost of such circuits, half-wave rectification has been employed, such that the motor is energized only during half cycles of the power source. The more expensive speed control circuits employ full-wave rectification.

Half-wave rectification of the power source voltage permits the motor to operate at only half of the designed capabilities thereof. A greater disadvantage of the half-wave rectifier speed control circuit is that of jitter produced, particularly at relatively low speeds of the motor. Such jitter is, of course, undesirable to the operator and may cause improper work results on the product being worked by the tool. Full-wave rectifier speed control circuits are, of course, much more expensive and add sufficiently to the cost of a power tool to prohibit competitive merchandising of the same. Therefore, a need exists for a circuit which is relatively inexpensive while eliminating the disadvantages of a half-wave rectifier speed control circuit.

With the advent of speed control circuits, various types of switches have been developed which include a speed control element of variable properties actuated by the switch mechanism. Therefore, actuation of such a switch through a relatively short distance initiates operation of the motor at a relatively slow speed and further depression of the switch increases the speed of the motor until complete depression of the switch provides full speed of the motor. Since it is relatively uncomfortable for an operator to hold a switch against the pressure of a spring bias thereon, a stop is usually provided at the fully depressed position of the switch to hold the switch in that position until released. However, with speed control circuits, an operator may desire to stop the switch at several intermediate points as well as at the fully depressed position.

An object of the present invention resides in the provision of a permanent magnet motor for hand-powered tools which employs permanent magnet sections which can enclose substantially the entire periphery of the rotor or armature without any substantial leakage.

Another object of the present invention resides in the provision of a permanent magnet motor for power hand tools having permanent magnet sections formed of a low density magnetic material and enclosing substantially the entire periphery of the armature such that the resultant flux path between the magnets is substantially parallel across an entire diameter of the armature.

Still another object of the present invention resides in the provision of a permanent magnet motor for power hand tools which employs magnetic sections of relatively low magnetic density and enclosing substantially the entire periphery of the armature which is formed of a plurality of pole pieces and a plurality of windings encircling a majority of half of the pole pieces.

Another object of the present invention is to provide a power hand tool which is relatively inexpensive to manufacture.

Still another object of the present invention is to provide a permanent magnet motor for a power hand tool wherein the permanent magnet sections are easily formed and do not require machining.

A further object of the present invention is to provide a permanent magnet motor for a power hand tool wherein the permanent magnet sections thereof do not tend to lose their inherent magnetization with vibrations.

A still further object of the present invention is to provide a permanent magnet motor for a hand tool wherein the permanent magnet sections thereof are not susceptible to breakage under sudden impacts, such as may occur when dropped.

A feature of the present invention resides in the provision of permanent magnet sections of rubber bonded barium ferrite composite materials in a permanent magnet motor for a power hand tool.

Another feature of the present invention resides in the provision of a speed control circuit for a permanent magnet motor which employs the constant back EMF of the motor for reducing vibrations and for producing a smooth operation thereof.

Still another feature of the present invention resides in the provision of a switch and variable control element in combination with a speed control circuit having a plurality of fixed positions between the released and the fully depressed position to provide various fixed speeds of a motor controlled thereby.

These and other objects, features and advantages of the present invention will be more fully realized and understood from the following detailed description when taken in conjunction with the accompanying drawings wherein:

FIGURE 1 is a side elevational view of a power hand tool with the housing thereof partly broken away to illustrate the internal parts of the same;

FIGURE 2 is a sectional view taken generally along lines II—II of FIGURE 1;

FIGURE 3 is a partial side elevational view in section of the handle portion of the power tool and illustrating a second embodiment of the control elements;

FIGURE 4 is an end view in section of the motor employed in the power hand tool of the present invention;

FIGURE 5 is a schematic diagram of the winding configuration of the armature employed in motors of the prior art;

FIGURE 6 is a schematic diagram of the winding configuration of the armature employed in the motor of the present invention;

FIGURE 7 is a view in perspective of the circuit board supporting the speed control circuit of the present invention;

FIGURE 8 is a sectional view taken generally along lines VIII—VIII of FIGURE 7;

FIGURE 9 is a schematic diagram of one embodiment of the speed control circuit of the present invention; and FIGURE 10 is another embodiment of a speed control circuit of the present invention.

Like reference numerals throughout the various views of the drawings are intended to designate the same or similar structures.

With reference to the drawings in detail, and in particular to FIGURE 1, there is shown one embodiment of the power hand tool of the present invention.

A housing 10 is generally formed of a main body portion 12, a handle portion 14, and a gear train housing 16. Extending from an end of the gear train housing 16 is a chuck 18 for holding a drill bit or the like which is disposed for being driven by a motor 20. The motor 20 is provided with a pair of shafts 22 and 24 at opposite ends thereof with the shaft 22 disposed for connection to the chuck 18 through a gear train within the housing 16 and the shaft 24 journalled for rotation within a bearing member 26. A fan 28 is secured to the shaft 22 for producing an airflow across the motor and through the housing. A plurality of air vents 30 are provided in the housing 12 for facilitating the passage of air therethrough.

The motor 20 includes an armature 32 having a plurality of windings 34. A pair of magnets 36 and 38 are positioned on opposite sides of the armature 32 and are secured to a flux return ring 40. Secured to the shaft 24 are a plurality of commutator bars 42 connected to respective ones of the windings 34. A brush 44 is positioned for engaging the commutator bars 42.

A speed control circuit is mounted within a control housing 46 and is actuated by a switch actuator 48 slidably mounted on pins 50. An actuator bar 48a is secured to the switch actuator 48 and engages a switch and variable control element within the control housing 46 for controlling the speed of the motor 20. A hole 52 is provided in the handle portion 14 for extension of the switch actuator 48 exteriorly of the housing 10. A rotatable reverse switch 54 is provided on the switch actuator 48 for reversing the rotational direction of the motor 20.

In order to provide a plurality of stops or fixed speed positions for the switch actuator 48, a plurality of slots 56 are disposed in one surface thereof and engageable by a spring biased pin 58. Depression of the switch actuator 48 to a position which will allow engagement of the pin 58 with a slot 56b sets the speed control circuit for relatively low-speed operation of the motor 20. Complete depression of the switch actuator 48 to allow engagement of the pin 58 with the slot 56a sets the speed control circuit for miximum speed of the motor 20. The intermediate slots between the slot 56a and the slot 56b provide stops for biasing the speed control circuit to drive the motor 20 at an intermediate speed.

The switch and speed control actuator 48 is more clearly illustrated in FIGURE 2. As shown therein, the actuator 48 is slidably mounted on the pins 50 and includes, at the forward end thereof, the reverse switch 54. The slots 56 are L-shaped as defined by undercuts 60 therein. Furthermore, one end of the pin 58 is flared as generally indicated by the reference numeral 58a. A retaining clip 62 is mounted on the control housing 46 and supports the pin 58 for engagement with the slots 56. The pin 58 is secured to an actuator 64 which is spring biased and slidable within a bushing 66 mounted on the clip 62. Therefore, when the switch actuator 48 is depressed a sufficient distance to allow engagement of the pin 58 with one of the slots 56, the actuator 64 can be depressed for engaging the flared end 58a of the pin 58 with the undercut portion 60 of the respective slot 56. Since the switch actuator 48 is spring biased outwardly of the control housing 46, its subsequent release will retain the pin 58 within a respective one of the slots 56 which will consequently maintain the switch actuator 48 in a fixed depressed position depending upon the particular slot engaged by the pin 58.

FIGURE 3 illustrates a second embodiment of the present invention wherein a switch actuator 72 extends from the opening 52 in the handle portion 14. The switch actuator 72 supports an actuator bar 72a which engages a variable element of the speed control circuit within a control housing 76. The switch actuator 72 includes a plurality of slots 74 which are disposed for being engaged by the pin 58 for holding the switch actuator 72 in predetermined fixed positions. In the embodiment illustrated in FIGURE 3, the switch actuator 72 does not include a reversing switch, but rather a separate reversing switch 78, of the slide-switch type, is mounted directly on the control housing 76. The slide-switch 78 extends through a second aperture 80 in the handle portion 14 and is readily accessible to be moved by the operator's finger during operation of the tool. The advantage provided by the embodiment illustrated in FIGURE 3 is that both hands are not required for performing the reversing operation. In the embodiment illustrated in FIGURE 1, one hand must hold the tool while the other hand rotates the switch 54. In the embodiment illustrated in FIGURE 3, however, the operator need only release the actuator 72 and slide the switch 78 to reverse the rotation of the motor 20.

FIGURE 4 illustrates an end view of the motor with only a few windings illustrated as being wound on the armature 32 for purposes of clarity. As shown therein, the armature 32 includes a plurality of rotor pole pieces 81–92, with the rotor pole pieces 81–85 encircled by windings 94; rotor pole pieces 82–86 encircled by windings 95; and rotor pole pieces 83–87 encircled by windings 96. Each of the other rotor pole pieces are encircled by respective windings (not shown in FIGURE 4) in a similar manner. The magnets 36 and 38 encircle the armature 32 and define a pair of air gaps 98 and 100 between opposite ends thereof. The ring 40 encircles the magnets 36 and 38 and provides a flux return path around the magnets.

Many of the novel features of the present invention are realized by the structure and arrangement illustrated in FIGURE 4 and the material of the magnets 36 and 38. In particular, the magnets 36 and 38 are preferably a rubber bonded barium ferrite composite material having magnetic properties substantially equal to those displayed by isotropic barium ferrite sintered magnets. Rubber bonded barium ferrite composite magnets are sold under the trademark "Plastiform." Barium ferrite, $BaFe_{12}O_{19}$, is a ferromagnetic material, which ferrite is diluted by a matrix or binder to produce rubber bonded barium ferrite magnets. In order to provide such magnets with magnetic properties equal to those of the isotropic ceramic magnet, an anisotropy form of ferrite must be employed. These types of magnets should not be confused with non-oriented, plastic, or rubber-based magnets of relatively low energy product. Because of the orientation, energy products as high as $2.25 \times 10^6$ are possible even with a volumetric dilution of 35%.

Ceramic materials are of a crystalline refractory nature and the sintering which is required for the production of permanent magnets of good quality makes the resultant products too hard to be cut or shaped by ordinary methods of machining. Some alnico materials are also produced in a similar manner. However, unless expensive compression forming dies are used, the pressing and sintering technique is not as well suited to the production of a variety of shapes as the casting method. Ceramic materials are as brittle as china, causing considerable loss due to breakage. Some sections invariably warp in sintering, and grinding is required in many cases.

The rubber bonded barium ferrite magnets, on the other hand, can readily be machined, cut, slit, punched, shaped, drilled, milled, or otherwise fabricated in simple or intricate shapes. This feature is in great contrast to most commonly used permanent magnet materials, which can only be ground after casting or sintering. The rubber bonded barium ferrite magnets possess, therefore, the quality of machinability which has been lacking in most other materials in the past. The finished magnets are limited as to shape only by the nominal cost involved in the production machining of bulk solids. In many cases, this material can be die cut before vulcanization thereof.

Therefore, the present invention employs as the magnets 36 and 38, an anisotropic barium ferrite based permanent magnet material having a binder or matrix of rubber or other elastomeric material. Ferromagnetic materials such as barium ferrite, once having been magnetized, are difficult to de-magnetize. The magnetic flux or strength of the magnet does not disappear when the magnetizing force is removed, but remains permanently. Therefore, such magnets are well adapted in many respects for use in a power hand tool.

However, it has been customarily considered necessary to employ a magnet having the highest maximum energy product available. Therefore, it is not clearly obvious that a rubber bonded barium ferrite magnet could be employed effectively in a power hand tool. However, by the arrangement illustrated in FIGURE 4, such rubber bonded barium ferrite magnets may be employed more effectively than other stronger magnets of the ceramic or alnico type. In order to make full use of the magnets, a smaller air gap is provided and more magnet material is employed, which would not be possible in a stronger magnet arrangement due to the resultant leakage therein.

As illustrated in FIGURE 4, a relatively small air gap is provided, such as indicated by the reference numerals 98 and 100. In the preferred embodiment of the present invention, the air gaps 98 and 100 are approximately equal to the thickness of one of the rotor bars 81–92 in a 12-bar rotor. Therefore, each magnet surrounds the armature 32 through an angle equal to 180° minus the angle 102, which angle 102 is preferably 30°. Furthermore, the distance between opposite ends on the internal surface of each of the magnets, generally designated with the reference numeral 104, is approximately equal to a diameter of the armature 32. By such arrangement, the flux path between the magnets 36 and 38 is approximately parallel across an entire diameter of the armature 32. By appropriate winding of the individual windings 94–96 on appropriate ones of the rotor bars 81–92, maximum use of the flux density across the entire armature is provided.

FIGURE 5 illustrates in schematic form a winding arrangement of an armature in a permanent magnet motor according to one form of the prior art. As shown in FIGURE 5, a pair of brushes 108 and 109 are disposed for making electrical contact with commutator bars 110–121 in sequential order. Each winding extends from a commutator bar, encircles two rotor bars and connects to an adjacent commutator bar. The motor schematically illustrated in FIGURE 5 includes a plurality of rotor bars 122–133 and a plurality of windings 134–145. Connection of the positive side of a voltage source to the brush 108 and the negative side of the voltage source to the brush 109 will produce current flows through the respective windings 134–145 as illustrated by the arrowheads thereon. A pair of magnets shown in dotted line outlines and designated with the reference numerals 148 and 149 are disposed on opposite sides of the armature. Due to the relatively large magnetic density of the magnets, relatively large air gaps were provided in such prior art structures and, consequently, the magnets surrounded a relatively small portion of the armature structure. In particular, the magnet 148 is illustrated as being disposed adjacent only the rotor bars 122, 123, and 133 and the magnet 149 as being disposed adjacent the rotor bars 127, 128, and 129 only. As a result, only a relatively small portion of the armature was effective in such prior art structures in producing rotational forces. However, the arrangement illustrated and similar arrangements of the prior art were necessary due to the large magnetic field density produced by the respective magnets.

FIGURE 6 illustrates in schematic form the arrangement according to the present invention which employs magnets of relatively low magnetic density, but employs substantially the entire rotor material for producing rotational forces. As illustrated therein, a brush 150 and the brush 44 are disposed for connection to commutator bars 151–162. Magnets 36 and 38 are positioned on opposite sides of the rotor and surrounds substantially the entire periphery thereof as illustrated by the dotted line outlines thereof illustrated in FIGURE 6. In order to provide maximum use of the rotor material, the individual windings encircle a minimum of five rotor bars. The arrangement, however, may be altered slightly to have each individual winding encircle six, rather than five, rotor bars. As illustrated in FIGURE 6, each of the windings 165–176 extends from a respective one of the commutator bars, around five of the rotor bars to an adjacent commutator bar. Therefore, the flux produced between the magnets 36 and 38 cuts through a greater number of current-carrying conductors in the windings to produce greater rotational forces in the armature.

FIGURES 7 and 8 illustrate a novel circuit board configuration according to the present invention which provides several novel features and advantages. As illustrated therein, the speed control circuit for the motor 20 may include components, such as indicated with the reference numerals 180 and 182 mounted on a Bakelite board 184, as well as other components (not shown in FIGURES 7 and 8) which may be mounted on the opposite side of the board 184. A copper strip 186 is mounted on the board 184 by crimping the ends thereof over the edges of the board. A silicon bead 188 is deposited on the copper strip 186 and a pair of electrodes 190 and 192 extend therefrom and through respective apertures in the board 184. Hollow rivets may be placed within the apertures for receiving the leads 190 and 192. The silicon bead 188 in combination with the copper strip 186 form the body of a silicon controlled rectifier with the terminals 190 and 192 forming the gate and cathode electrodes and the strip 186 forming the anode electrode thereof. The use of a copper strip provides a heat sink for the body of the silicon controlled rectifier which is subject to conducting relatively high currents. The use of such a copper strip as a heat sink, provides several novel results. For instance, protection is afforded for the circuit components if the copper strip extends across the entire length of the board 184. By having the leads 190 and 192 extending through the hollow rivets in the circuit board 184, any flexure of the leads will not be transmitted to the silicon chip 188 which would tend to cause breakage thereof. In addition, greater support is provided to the leads 190 and 192 by the hollow rivets. If desired, a potting compound, such as silicone rubber, may be filled in under the copper strip 186 and between the board for holding the components in position. By the use of the heat sink the copper strip 186, a smaller power SCR can be employed which will reduce the ultimate cost of the circuit. The copper strip is secured rigidly to the board 184 to provide the desired protection and a lead is soldered directly to the copper strip for forming the anode lead of the SCR.

FIGURE 9 illustrates one embodiment of the speed control circuit of the present invention. A pair of terminals 200 and 202 are disposed for connection to a source of voltage. The terminal 200 is connected through a diode rectifier 210 to a circuit point 212 and the terminal 202 is connected through a diode rectifier 214 to the circuit point 212. One side of the motor 20 is connected to the circuit point 212 and the other side thereof is connected through a thyristor or a silicon controlled rectifier 216 to the terminal 200. The circuit from the terminal 202 to the terminal 200 including the rectifier 214, the motor 20, and the SCR 216, forms a half-wave rectifier circuit for energizing the motor 20. The circuit loop including the motor 20, the SCR 216, and the rectifier 210 forms a current conduction path for the back EMF of the motor 20. These two circuits in combination with one another provide motor operation similar to that provided by a full-wave rectifier circuit. A reversing switch 204 is connected for changing the connection of the motor 20 in the circuit by reversing the circuit points 206 and 208.

In order to fire or trigger the SCR 216, a biasing circuit 218 is connected from the anode of the SCR 216 to the gate electrode thereof and to the terminal 200. The biasing circuit 218 includes a variable resistor 220, a fixed resistor 222, a diode rectifier 224, a capacitor 226, and a neon lamp 228. The resistor 220 is varied by the switch actuator 48 in FIGURE 1 or the switch actuator 72 in FIGURE 3 to vary the speed of the motor 20. An "on-off" switch (not shown in FIGURE 9) would, of course, also be actuated by the switch actuator 48 or 72 and would be connected between the voltage source and one of the terminals 200 or 202. The resistors 220 and 222, the diode 224 and the capacitor 226 form a series circuit from the anode of the SCR 216 to the terminal 200. When a positive cycle of voltage appears on the terminal 202, a current flow is produced through this series circuit to charge the capacitor 226 to a particular level. When the capacitor 226 has charged sufficiently, the neon lamp 228 discharges, triggering the SCR 216 and causing current conduction therethrough. Because of the relative values of the resistors 220 and 222, current conduction through this series circuit does not energize the motor 20. However, when the SCR 216 is triggered into a conductive state, current flow through the motor 20 increases sufficiently to cause energization thereof. Variation of the resistance value of the resistor 220 changes the charging time of the capacitor 226 therefore altering the point in a particular cycle at which the SCR 216 will trigger. As the SCR 216 is triggered later in a particular cycle of the applied voltage, smaller increments of current will be permitted to pass through the motor 20, thereby causing a reduction in the speed thereof. Therefore, an effective speed control circuit is provided for the motor 20.

When the positive cycle of voltage on the terminal 202 has diminished to zero and subsequently a negative cycle appears, practically no current will flow through the circuit from the applied voltage source. At that time, the back EMF of the motor 20 will produce a current flow through the SCR 216 and the diode rectifier 210 which will sustain the rotation of the motor 20. Since the SCR 216 is conductive immediately prior to reversal of the voltage on the terminal 202, the applied back EMF from the motor 20 will retain the SCR 216 conductive to allow the resultant current to flow therethrough. Although the current produced by the back EMF of the motor 20 does not add to the rotational forces therein, permitting the same to flow through a closed loop sustains the rotation of the motor 20 without any braking force resulting therefrom. That is, if the closed loop for the current produced by the back EMF through the motor 20 were not present in the circuit, a braking effect would result on the motor 20. When the positive cycle of voltage on the terminal 200 reaches a predetermined level, the SCR 216 will be turned "off" eliminating current flow therethrough caused by the back EMF of the motor 20. The time period for this cutoff to occur is dependent upon the back EMF of the motor 20 or the speed of the motor 20. Therefore, the control provided by the resistor 220 during one-half cycle of the applied voltage will be reflected into the next half-cycle when current is flowing from the back EMF of the motor 20.

In order to remove the positive voltage from the gate of the SCR 216, a diode 230 is connected in series with a resistor 232 between the positively charged end of the capacitor 226 and the terminal 202. This series circuit of the diode 230 and the resistor 232 removes the charge from the capacitor 226 over a definite time interval and prior to the occurrence of a positive cycle of voltage on the terminal 202. Therefore, the subsequent positive cycles of voltage on the terminal 202 will not cause current conduction through the motor 20 until the SCR 216 is again triggered by the biasing circuit 218.

The circuit illustrated in FIGURE 9 can be employed with a motor having a wound field coil. In that instance, another pair of rectifiers would be connected in parallel with the rectifiers 210 and 214 as a full-wave bridge rectifier circuit and the field winding would be connected between opposite terminals of the full-wave bridge with the circuit point 212 forming one of the terminals.

FIGURE 10 illustrates another embodiment of the speed control circuit which may be employed with the power tool of the present invention. A pair of terminals 234 and 236 are disposed for connection to a source of alternating current voltage. A three-position switch 238 includes a movable contact connected to the terminal 234. A fixed contact 240 of the switch 238 is connected through a line 242 and a motor 243 to the terminal 236. The motor 243 is preferably an A.C. universal motor. Another fixed contact 244 of the switch 238 is connected through a silicon controlled rectifier 246 and the motor 243 to the terminal 236. Another fixed contact 248 of the switch 238 constitutes an "off" position. The fixed contact 244 is also connected through a voltage divider circuit including a plurality of series-connected resistors 250, 252, 254, and 256 and a diode rectifier 258 to the terminal 236. A capacitor 260 is connected in parallel with the diode 258.

A four-position switch 262 includes a fixed contact 264 connected to the junction of the resistors 250 and 252; a fixed contact 266 connected to the junction of the resistors 252 and 254; a fixed contact 268 connected to the junction of the resistors 254 and 256; and a fixed contact 270 connected to the cathode of the diode 258. A movable contact of the switch 262 is connected through a diode rectifier 272 and a variable resistor 274 to the cathode of the SCR 246 and one side of the motor 243. The wiper arm of the variable resistor 274 is connected to the gate electrode of the SCR 246.

When the movable contact of the switch 238 is in contact with the fixed contact 244 thereof, the biasing circuit for the SCR 246 including the voltage divider circuit and the motor 243 in series with the SCR 246 are connected to the voltage source. The position of the movable contact of the switch 262 and the movable contact on the resistor 274 set the bias level for the SCR 246 and, therefore, the speed of the motor 243. Therefore, several speed ranges can be selected by changing the position of the switch 262 and a variation within this speed range can be effected by varying the resistor 274. For instance, when the movable contact of the switch 262 is in contact with the fixed contact 270, a range of 0–200 r.p.m. may be achieved by variation of the resistor 274. Similar ranges and variations within such ranges can be effected by actuation of the switch 262 to the other positions. Connection of the movable contact of the switch 262 with the fixed contact 268 may provide a speed range of 200–600 r.p.m.; with the fixed contact 266 may provide a range of 600–1200 r.p.m.; and with the fixed contact 264 may provide a range of 1200–1950 r.p.m. Within each one of these ranges, variation of the resistor 274 would provide a speed variation of the motor 243 from the lower limit to the upper limit of each range.

When the movable contact of the switch 238 is in contact with the fixed contact 240, the voltage source is connected directly through the line 242 and the motor 243 to provide full speed operation. Preferably the switch 238 is ganged with the movable contact on the resistor 274 such that movement of the movable contact of the switch 238 across the terminal 244 changes the position of the movable contact on the resistor 274. In this manner, a speed range can be selected by actuation of the switch 262 to one of the fixed contacts 264, 266, 268 or 270, and the switch 238 can be varied to vary the speed of the motor within a respective one of the selected ranges. This arrangement can also be employed with the switch actuator structures illustrated in FIGURES 1 and 3. As illustrated in FIGURE 3, the switch actuator 72, when depressed to allow engagement of the pin 58 with the slot 75, will set the speed of the motor at the lower limit thereof by proper positioning of the movable contact on the resistor 274. As the switch actuator is moved from the slot 75 position to the slot 74 position, the movable contact on the resistor 274 is moved across the resistor to increase the speed of the motor 243 to the upper limit thereof.

Depression of the switch actuator 72 in FIGURE 3 to allow engagement of the pin 58 with the slot 74 actuates the movable contact of the switch 238 to connect with the fixed contact 240 and provide full speed operation of the motor 243. Therefore, any movement of the switch actuator between the slots 74 and 75 varies the speed of the motor 20 within a particular speed range selected by the switch 262. The switch 262 may be mounted on the housing 12 at a point which is readily accessible to the operator. Therefore, by the use of a two-position actuator, such as that illustrated in FIGURE 3, a plurality of speeds can be obtained while the actuator 72 is locked into position.

The principles of the invention explained in connection with the specific exemplification thereof will suggest many other applications and modifications of the same. It is accordingly desired that, in construing the breadth of the appended claims they shall not be limited to the specific details shown and described in connection with the exemplifications thereof.

The invention claimed is:

1. A power tool comprising a housing forming a motor chamber and a handle portion and a motor having an output shaft, said motor including an armature having a plurality of pole pieces, a plurality of windings encircling a majority of half of said pole pieces, a pair of permanent magnets positioned on opposite sides of said armature, said magnets enclosing substantially the entire periphery of said armature and having a dimension from opposite ends of an internal surface of each substantially equal to a diameter of said armature such that the resultant flux path between said magnets is substantially parallel across an entire diameter of said armature, a power source and a speed control circuit mounted in said handle portion, said speed control circuit including a half-wave rectifier circuit connected between said armature and said power source, said half-wave rectifier circuit including means defining a complete current path for the resultant current produced by the back EMF of said motor, said speed control circuit includes an adjustable parameter element disposed for controlling current flow through said motor and further comprising a speed control unit connected to said half-wave rectifier circuit including means for varying said adjustable parameter element of said half-wave rectifier circuit to control current flow through said motor, said varying means includes a spring-biased actuator and said unit includes means defining a plurality of fixed positions with respect to said housing for holding said actuator in a plurality of fixed positions relative to said adjustable parameter element.

2. A power tool as defined in claim 1 wherein said speed control unit includes a switch connected to said actuator and disposed for actuation independently of said adjustable parameter element.

3. A power tool comprising a housing forming a motor chamber and a handle portion and a motor having an output shaft, said motor including an armature having a plurality of pole pieces, a plurality of windings encircling a majority of half of said pole pieces, a pair of permanent magnets positioned on opposite sides of said armature, said magnets enclosing substantially the entire periphery of said armature and having a dimension from opposite ends of an internal surface of each substantially equal to a diameter of said armature such that the resultant flux path between said magnets is substantially parallel across an entire diameter of said armature, a power source and a speed control circuit mounted in said handle portion, said speed control circuit including a half-wave rectifier circuit connected between said armature and said power source, said half-wave rectifier circuit including means defining a complete current path for the resultant current produced by the back EMF of said motor, wherein said speed control circuit includes a controlled rectifier device, said current path means including means defining a complete current path through said controlled rectifier device for the resultant current produced by the back EMF of said motor, wherein said controlled rectifier device includes a copper strip and a silicon bead secured to one surface of said copper strip.

4. A power tool as defined in claim 3 further comprising a circuit mounting board disposed for receiving and mounting circuit elements thereon, said copper strip having ends thereof engaging edges of said board, a center portion of said one surface of said copper strip being spaced from and facing toward said board.

5. A power tool as defined in claim 4 wherein said circuit mounting board includes a pair of apertures therein, and further comprising a pair of electrodes connected to said silicon bead and forming a cathode and a gate electrode respectively of said silicon controlled rectifier, each of said electrodes extending through a respective aperture in said board.

6. A power tool comprising a housing forming a motor chamber and a handle porton and a motor having an output shaft, said motor including an armature having a plurality of pole pieces, a plurality of windings encircling a majority of half of said pole pieces, a pair of permanent magnets positioned on opposite sides of said armature, said magnets enclosing substantially the entire periphery of said armature and having a dimension from opposite ends of an internal surface of each substantailly equal to a diameter of said armature such that the resultant flux path between said magnets is substantially parallel across an entire diameter of said armature, a power source and a speed control circuit mounted in said handle portion, said speed control circuit including a half-wave rectifier circuit connected between said armature and said power source, said half-wave rectifier circuit including means defining a complete current path for the resultant current produced by the back EMF of said motor, wherein said speed control circuit includes a silicon controlled rectifier connected in series with said motor across said power source, a first rectifier connected in parallel to said controlled rectifier and said motor, and means for biasing said controlled rectifier for conducting thereof, wherein said biasing means includes a resistor and a capacitor connected in series across said silicon controlled rectifier, a gate electrode of said silicon controlled rectifier being connected to the junction of said capacitor and said resistor, and means for discharging said capacitor during alternate half-cycles of the voltage of said power source.

7. A power tool comprising a housing forming a motor chamber and a handle portion and a motor having an output shaft, said motor including an armature having a plurality of pole pieces, a plurality of windings encircling a majority of half of said pole pieces, a pair of permanent magnets positioned on opposite sides of said armature, said magnets enclosing substantially the entire periphery of said armature and having a dimension from opposite ends of an internal surface of each substantially equal to a diameter of said armature such that the resultant flux path between said magnets is substantially parallel across an entire diameter of said armature, a power source of alternating voltage, and a speed control circuit including a thyristor connected in series with said armature to said power source, means for biasing said thyristor during alternate half-cycles of the voltage of said power source including a voltage divider circuit connected to said power source and having a plurality of taps and a switch having a plurality of fixed contacts and a movable contact engageable with said fixed contacts, each of said fixed contacts connected to a respective one of said taps, said movable contact connected to said thyristor, means for selectively connecting said motor directly to said power source and through said thyristor to said power source.

8. A speed control circuit for a motor comprising a source of of alternating current voltage, and a half-wave rectifier circuit connected between said source of voltage and said motor, said half-wave rectifier circuit including means defining a complete current path fo the resultant current produced by the back EMF of said motor, said current path means including a thyristor, and further comprising means for biasing said thyristor during alternate half-cycles of one polarity of said voltage source, said current path means including means defining a complete current path through said thyristor for the resultant current produced by the back EMF of said motor during alternate half-cycles of the other polarity of said voltage source, wherein said biasing means includes a resistor and a capacitor connected in series across said thyristor, a gate electrode of said thyristor being connected to the junction of said capacitor and said resistor, and means for discharging said capacitor during the alternate half-cycles of the other polarity of said voltage source.

9. A speed control circuit as defined in claim 8 wherein said discharging means includes a diode rectifier connected in series with said capacitor across said voltage source, said diode rectifier being poled to conduct during the alternate half-cycles of the other polarity of said voltage source.

10. A speed control circuit as defined in claim 9 further comprising a reversing switch connected in parallel with said motor.

11. A speed control circuit for a motor comprising a source of alternating current voltage, and a half-wave rectifier circuit connected between said source of voltage and said motor, said half-wave rectifier circuit including means defining a complete current path for the resultant current produced by the back EMF of said motor, wherein said half-wave rectifier circuit includes a pair of first diode rectifiers connected in series with one another across said voltage source and being oppositely poled with respect thereto, a thyristor connected on one side thereof through said motor to the junction of said first diode rectifiers and on the other side thereof to one side of said voltage source, a first resistor and capacitor connected in parallel with said thyristor, means connecting the junction of said capacitor and said first resistor to a gate of said thyristor, a second resistor and a second diode rectifier connected between the junction of said capacitor and said first resistor to the other side of said voltage source.

12. A speed control circuit as defined in claim 11 wherein said first resistor is variable .

13. A speed control circuit as defined in claim 11 further comprising a third diode rectifier connected in series with said first resistor and said capacitor across said thyristor.

14. A speed control circuit as defined in claim 11 wherein said first resistor is variable and further comprising an actuating member for said first resistor, and means defining a plurality of fixed positions for said actuating member each defining a different resistance value of said first resistor.

15. A speed control circuit for a motor comprising a source of alternating current voltage, a thyristor connected in series with said motor to said voltage source, means for biasing said thyristor during alternate half-cycles of said voltage source including a voltage divider circuit connected to said voltage source and having a plurality of taps and a switch having a plurality of fixed contacts, a movable contact engageable with said fixed contacts, each of said fixed contacts connected to a respective one of said taps, said movable contact connected to said thyristor, and further comprising means for selectively connecting said motor directly to said voltage source and through said thyristor to said voltage source.

16. A speed control circuit for a motor comprising a source of alternating current voltage, a thyristor connected in series with said motor to said voltage source, means for biasing said thyristor during alternate half-cycles of said voltage source including a voltage divider circuit connected to said voltage source and having a plurality of taps and a switch having a plurality of fixed contacts, a movable contact engageable with said fixed contacts, each of said fixed contacts connected to a respective one of said taps, said movable contact connected to said thyristor, a variable parameter element connected in series between said movable contact and said thyristor and disposed for controlling current flow therethrough, and means for varying said variable parameter element.

17. A speed control circuit as defined in claim 16 wherein said varying means includes an actuating member and further comprising a switch mechanically connected to said actuating member and disposed for actuation independently of said variable parameter element, said switch disposed for disconnecting said voltage source from said motor.

18. A speed control circuit as defined in claim 17 including means defining a plurality of stationary positions for said actuator with respect to said variable parameter element, one of said positions disposing said variable parameter element at a relatively low resistance value and another of said positions disposing said variable parameter element at a relatively high resistance value.

19. A speed control circuit for a motor comprising a source of alternating current voltage, a thyristor connected in series with said motor to said voltage source, means for biasing said thyristor during alternate half-cycles of said voltage source including a voltage divider circuit connected to said voltage source and having a plurality of taps and a switch having a plurality of fixed contacts, a movable contact engageable with said fixed contacts, each of said fixed contacts connected to a respective one of said taps, said movable contact connected to said thyristor, a potentiometer connected between said movable contact and a cathode of said thyristor, said potentiometer including a wiper arm connected to a gate of said thyristor, and means for varying the position of said wiper arm.

20. A speed control circuit as defined in claim 19 further comprising a first diode connected in series with said potentiometer.

21. A speed control circuit as defined in claim 20 further comprising a second diode and a capacitor connected in parallel with one another and in series with said voltage divider circuit across said voltage source.

22. A speed control circuit as defined in claim 19 further comprising a diode connected in series with said voltage divider circuit across said voltage source.

23. A speed control circuit as defined in claim 22 further comprising a capacitor connected in parallel with said diode.

24. A speed control circuit for a motor comprising a source of alternating current voltage, a thyristor connected in series with said motor to said voltage source, means for biasing said thyristor during alternate half-cycles of said voltage source including a voltage divider circuit connected to said voltage source and having a plurality of taps and a switch having a plurality of fixed contacts, a movable contact engageable with said fixed contacts, each of said fixed contacts connected to a respective one of said taps, said movable contact connected to said thyristor, wherein said thyristor includes a copper strip and a silicon bead secured to one surface of said copper strip.

25. A speed control circuit as defined in claim 24 further comprising a circuit mounting board, said voltage divider circuit being mounted on said circuit mounting board, said copper strip having ends engaging edges of said circuit mounting board and having a center portion spaced from said board over said voltage divider circuit, said one surface of said copper strip facing one surface of said board.

References Cited

UNITED STATES PATENTS

| | | | |
|---|---|---|---|
| 3,165,688 | 1/1965 | Gutzwiller | 318—246 |
| 3,209,228 | 9/1965 | Gawron | 318—345 |
| 3,213,303 | 10/1965 | Riley et al. | 310—50 |
| 3,225,232 | 12/1965 | Turley et al. | 318—345 X |
| 3,242,410 | 3/1966 | Cockrell | 318—331 |
| 3,271,648 | 9/1966 | Weed | 318—331 |
| 3,278,821 | 10/1966 | Gutzwiller | 318—331 |
| 3,383,943 | 5/1968 | Piber | 74—529 |

WARREN E. RAY, Primary Examiner

U.S. Cl. X.R.

74—529; 310—50, 68, 154, 195; 317—101